United States Patent [19]

Ercoli et al.

[11] Patent Number: 6,162,553
[45] Date of Patent: Dec. 19, 2000

[54] X-RAY INTENSIFYING SCREEN

[75] Inventors: Marcella Ercoli, Varazze; Carlo Morozzo della Rocca, Savona, both of Italy

[73] Assignee: Eastman Kodak Company, Rochester, N.Y.

[21] Appl. No.: 09/184,211

[22] Filed: Nov. 2, 1998

[30] Foreign Application Priority Data

Nov. 5, 1997 [EP] European Pat. Off. ............... 97119308

[51] Int. Cl.$^7$ ............................ B32B 27/30; G03B 21/00
[52] U.S. Cl. ...................... 428/690; 428/423.1; 428/522; 250/483.1
[58] Field of Search ..................................... 428/690, 913, 428/522, 423.1; 250/483.1

[56] References Cited

U.S. PATENT DOCUMENTS

| | | | |
|---|---|---|---|
| 4,292,107 | 9/1981 | Tanaka et al. | 156/249 |
| 5,091,483 | 2/1992 | Mazurek et al. | 525/477 |
| 5,411,806 | 5/1995 | Dahlquist | 428/411.1 |
| 5,520,965 | 5/1996 | Dahlquist et al. | 427/515 |

*Primary Examiner*—William Krynski
*Assistant Examiner*—Dawn L. Garrett
*Attorney, Agent, or Firm*—J. Lanny Tucker

[57] ABSTRACT

The present invention relates to an X-ray intensifying screen and to the method of manufacturing thereof. The X-ray intensifying screen comprises a support having deposited thereon a phosphorescent layer comprising a phosphor dispersed in a photocurable binder, wherein said binder comprises a photopolymerizable mixture of at least one urethane (meth)acrylate prepolymer, at least one photopolymerizable monomer and/or oligomer, and a photoinitiator, and said phosphorescent layer is cured by radiation after deposition onto said support.

19 Claims, No Drawings

X-RAY INTENSIFYING SCREEN

FIELD OF THE INVENTION

This invention relates to an X-ray intensifying screens. More specifically, the invention relates to X-ray intensifying screens comprising a radiation emitting phosphor layer, the screen having improved speed, granularity and sharpness relationships.

BACKGROUND OF THE ART

It is known in the art of medical radiography to employ intensifying screens to reduce the X-ray dosage to the patient. Intensifying screens absorb the X-ray radiation and emit electromagnetic radiation which can be better absorbed by silver halide emulsion layers. Another approach to reduce the X-ray dosage to the patient is to coat two silver halide emulsion layers on the opposite sides of a support to form a duplitized radiographic element. Accordingly, it is a common practice in medical radiography to use a radiographic assembly consisting of a duplitized radiographic element interposed between a pair of front and back screens.

The typical structure of an intensifying screen comprises a support and a phosphor layer coated thereon. The phosphor layer comprises a fluorescent substance able to emit light when exposed to X-ray, mixed with a binder. Additionally, a primer layer is sometimes provided between the phosphorescent layer and the substrate to assist in bonding the phosphorescent layer to the substrate, and a reflective layer is sometimes provided between the substrate (or the primer) and the phosphorescent layer. Finally, a protective layer for physically and chemically protecting the screen is usually provided on the surface of the phosphorescent layer.

Intensifying screens are usually prepared by preparing a dispersion of the phosphor/binder mixture in an appropriate solvent and coating such a dispersion on a support using any well-known coating method (e.g., doctor blade, roll coater, knife coater and the like). After the coating, the solvent is removed from the phosphor layer.

The screens most widely used in radiography can be classified according their characteristic speed in (1) fast screens, (2) average screens, and (3) slow screens. The speed of a screen is directly proportional to the thickness of the phosphor layer, that is, to the amount of phosphor in the phosphor layer, and to the grain size of the phosphorescent substance.

A well known problem of intensifying screens relates to the sharpness of the resulting image. The presence of the intensifying screen reduces the sharpness of the resulting image, in particular when fast screens are used. This is due to the large phosphorescent crystals and to the high thickness employed to realize the fast screens. However, there are situations where a reduction in exposure is of prime importance in spite of some sacrifice in image sharpness.

Another critical problem of intensifying screens relates to the noise or granularity of the resulting image. Granularity of intensifying screens can be improved by increasing the amount of phosphor in the phosphor layer, but this negatively affects sharpness. Sharpness and granularity concurs together to define the quality of the resulting radiographic image.

In recent years there have been many attempts to produce radiographic screens having an improved relationship between speed and image quality (sharpness and granularity).

U.S. Pat. Nos. 4,952,813 and 4,910,407 disclose a method for preparing an intensifying screen in which the phosphor contained in a phosphor layer is densely packed by means of a compression treatment which reduces the percentage of voids in the phosphor layer. The method disclosed in U.S. Pat. No. 4,952,813 can improve the sharpness of the resulting intensifying screen, but speed and granularity are significantly reduced. U.S. Pat. Nos. 5,164,224 and 5,153,078 disclose a method for preparing radiation image storage and intensifying screens similar to U.S. Pat. No. 4,952,813, but using a specific class of thermoplastic binder which is capable of reducing the deterioration of the speed and graininess caused by the compression treatment. The sharpness of the screens obtained with the teaching of the above mentioned patents is not, however, significantly improved. EP 579,016 and EP 577,027 teach the use of a specific fluorinated top-coat having a thickness lower than 5 $\mu$m in order to achieve a further improvement in residual stain. However, the use of the specific fluorinated top-coat has no particular effect on sharpness, speed and graininess of the resulting intensifying screen. The compression treatment disclosed in these patents provides a higher packing density of the phosphor in the phosphor layer, but also causes a mechanical stress to the phosphor particles, reducing their efficiency and, consequently, speed, and requires an additional and expensive compression step during manufacturing.

U.S. Pat. No. 4,292,107 discloses an intensifying screen in which a UV-radiation curable resin is used as a binder for the phosphor layer. The preparation method consists of (1) preparing the dispersion of the phosphor in a UV-curable binder consisting of an unsaturated resin, a polymerizable monomer and a sensitizer with a phosphor to binder ratio of from 1:1 to 20:1, (2) coating the resulting dispersion on a polyethylene terephthalate film support to provide a phosphor layer, and then (3) curing the resulting phosphor layer. Unsaturated resins useful in the process of this patent are defined as polyester acrylate, urethane polyester acrylate, polyester methacrylate, epoxy acrylate, and polyether acrylate.

U.S. Pat. Nos. 5,411,806 and 5,520,965 disclose a method for producing an intensifying screen with better speed/sharpness relationship by employing a curable composition containing less than 5% of non-curable organic material having molecular weight less than 500. The preferred curable composition disclosed in these patents comprises UV curable acrylamidosiloxane polymers as described in U.S. Pat. No. 5,091,483.

In spite of the above-mentioned work, there is still the need to have an intensifying screen which shows high speed with high image quality, in particular improved granularity.

SUMMARY OF THE INVENTION

The present invention relates to an X-ray intensifying screen comprising a support having deposited thereon a phosphorescent layer comprising a phosphor dispersed in a photocurable binder, wherein the photocurable binder comprises a mixture of at least one urethane (meth)acrylate prepolymer, at least one photopolymerizable monomer and/or oligomer, and a photoinitiator, and the phosphorescent layer is cured with radiation after deposition on the support.

The present invention also relates to the method of manufacturing of the above-described X-ray intensifying screen.

DETAILED DESCRIPTION OF THE INVENTION

The intensifying screen of this invention comprises a phosphorescent layer comprising a binder and at least one phosphor dispersed therein. Although the phosphorescent layer itself can be an intensifying screen when the phosphorescent layer is self-supporting, the phosphorescent layer is generally provided on a substrate to form an intensifying screen.

The photocurable resinous binder used in the present invention basically comprises a photoinitiator solubilized into a mixture of at least one photopolymerizable monomer and/or oligomer and at least one urethane (meth)acrylate prepolymer.

The urethane (meth)acrylate prepolymer imparts most of the basic properties to the coating dispersion (such as viscosity, stability, wetting power, and the like) and to the final cured phosphorescent layer (such as hardness, adhesion, and flexibility). The urethane (meth)acrylate prepolymer is preferably chosen among polyether urethane (meth)acrylates, polyester urethane (meth)acrylates, and polyol urethane (meth)acrylates. Aliphatic polyether or polyester or polyol urethane (meth)acrylates crosslinking into a tough and flexible material and not reducing the speed of the cured screen due to the yellowing characteristics of aromatic derivatives are more preferred. Urethane (meth)acrylates are preferably added in an amount ranging from 20 to 50%, preferably from 30% to 40% by weight of the photocurable resinous binder.

Urethane (meth)acrylates can be formulated alone or in combination with a low percentage of at least one additional prepolymer to improve the above mentioned basic properties of the coating dispersion and the final cured phosphorescent layer. Suitable additional prepolymers include epoxy (meth)acrylates and polyester (meth)acrylates. Polyester and epoxy (meth)acrylates can reduce the viscosity of the coating dispersion, improve the wetting power of the binder versus the phosphor particles (giving a more stable dispersion) and produce a harder material. Additional prepolymers are preferably added in amounts ranging from 1 to 30%, more preferably from 5 to 20% by weight of the photocurable resinous binder, to avoid a negative effect on flexibility of the final cured phosphorescent layer.

Both urethane (meth)acrylate prepolymers and other additional prepolymers are characterized by a weight-average molecular weight ranging from 600 to 10,000, preferably from 1000 to 5,000.

The photopolymerizable monomer or oligomer carries out two primary functions. It increases the crosslink density by forming links between the prepolymer molecules and other monomer units. In addition, it acts as diluent of the prepolymer reducing the viscosity of the system. The monomer can be di-, tri- or tetra-functional, such as (meth)acrylic esters of polyhydroxy alcohols, e.g., diethyleneglycol diacrylate, tripropyleneglycol diacrylate, polyethileneglycol diacrylate or dimethacrylate, neopentylglycoldiacrylate, 1,6-hexandiol diacrylate, trimethylolpropane triacrylate, pentaerythritol triacrylate, trimethylolpropane ethoxy triacrylate, and di-trimethylolpropane tetracrylate. Ethoxylated and propoxylated polyol monomers are preferred since they have lower toxicity and exhibit low volatility, low viscosity, high reactivity and good mechanical properties.

The photopolymerizable monomer or oligomer is characterized by a weight-average molecular weight lower than 500, preferably lower than 300.

Preferably, the photoinitiator absorbs radiation between 200 nm and 500 nm and produces free radicals which promote the crosslinking reaction between the prepolymer and the monomer. Suitable photoinitiators include benzoin and acethophenone derivatives, benzylketales, α-hydroxyalkylphenones, α-aminoalkylphenones, acylphosphine oxides, acylphosphonates, benzophenone, xanthones, tioxanthones, aromatic 1,2-diketones and mixtures thereof. Preferably, the photoinitiator is present in an amount from 0.01 to 10% by weight of the photocurable resinous binder, more preferably from 0.1 to 4%. Structures like acyl phosphine oxide derivatives, having an absorption peak shifted toward the visible region, are preferred since they give a more efficient curing of the high pigmented layer at the lowest concentrations (0.5–1%).

An additional reacting monomer and other additives can be optionally added to adjust the physical and rheological characteristics of the coating dispersion as required by the manufacturing method.

A monofunctional (meth)acrylate or a non-acrylate monomer can optionally be added as additional reacting monomer. Primarily, the monofunctional monomer is used to adjust the viscosity of the final dispersion. However, by reacting into the finished product, it also affects the properties of the cured coating by enhancing the adhesion to the substrate and hardening or flexibilizing the cured material. Suitable non-acrylate monomers include styrene, vinyl acetate, and N-vinyl pyrrolidone. Other useful (meth)acrylate monomers include alkyl (meth)acrylates, hydroxyalkyl (meth)acrylates, b-carboxyethyl (meth)acrylate, isobornyl (meth)acrylate, tetrahydrofurfuryl (meth)acrylate, 2-(2-ethoxyethoxy)ethyl (meth)acrylate, monofunctional aliphatic urethane (meth)acrylates. (Meth)acrylate monomers having low vapor pressure are preferred.

Other additives may also be added, for example, wetting agents, antistats, dispersing agents, slipping agents, plasticizers, and stabilizers. Wetting and dispersing agents assist in promoting the dispersion of phosphor particles into the described photopolymerizable resinous binder. High and low molecular weight, anionic, cationic or neutral polymers comprising groups having pigment affinity (like poly(meth)acrylate or polyether polymers with phosphates or carboxylic acid groups in the side chains) can be adsorbed on the phosphor surface. By absorbing onto the surface of the phosphor, the polymers by either electrostatic repulsion or sterical hindrance provide a dispersion with reduced viscosity and good flow which provides easier handling of the dispersion and improved processability. Acrylate modified silicons and siloxane (co)polymers may be added as slipping agents and also to improve the flexibility of the final cured phosphorescent layer. Plasticizers can be used as coating aids or flexibilizers. Stabilizers are often added to prevent unwanted bulk polymerization during the process. Preservatives may be incorporated as well as to retard the degradation caused by environmental attack. The above mentioned additives are added to the formulation in an amount of from 0.01 to 10%, more preferably 0.1 to 5%, and most preferably from 0.5 to 1% by weight of the total binder. Acrylate modified silicons and siloxane polymers may result in poor adhesion to the base and insufficient hardness and scratch resistance; therefore, they are preferably used at lower concentrations of from 0.1 to 1% by weight.

Suitable radioluminescent phosphors are well known by those skilled in the art and include materials such as tungstate phosphors, terbium activated rare earth oxisulfide phosphors, terbium activated rare earth phosphate phosphors, terbium activated rare earth oxyhalide phosphors, thulium activated rare earth oxyhalide phosphors, barium sulfate phosphors, divalent europium activated alkaline earth metal phosphate phosphors, divalent europium activated alkaline earth metal fluorohalide phosphors, tantalate phosphors, sulphide phosphors and the like.

An organic treatment may be present on the surface of the phosphor particles. For example, the phosphor surface may be treated by dispersing the phosphor in an appropriate liquid dispersing medium (e.g., water) together with an organotitanate compound or a silane compound. The treatment can improve the wettability of the particles during the dispersion.

The phosphors used in the intensifying screen of the present invention have an emission maximum wavelength in the ultraviolet, blue, green, red or infrared region of the electromagnetic spectrum. More preferably, the phosphors emit radiation in the ultraviolet, blue and green regions of the electromagnetic spectrum.

Green emitting phosphors preferably emit radiation having more than about 80% of its spectral emission above 480 nm and its maximum of emission in the wavelength range of 530–570 nm. Suitable green emitting phosphors include rare earth activated rare earth oxysulfide phosphors of at least one rare earth element selected from yttrium, lanthanum, gadolinium and lutetium, rare earth activated rare earth oxyhalide phosphors of the same rare earth elements, a phosphor composed of a borate of the above rare earth elements, a phosphor composed of a phosphate of the above rare earth elements and a phosphor composed of tantalate of the above rare earth elements. These rare earth green emitting phosphors have been extensively described in the patent literature, for example, in U.S. Pat. Nos. 4,225,653, 3,418,246, 3,418,247, 3,725,704, 3,617,743, 3,974,389, 3,591,516, 3,607,770, 3,666,676, 3,795,814, 4,405,691, 4,311,487 and 4,387,141. These rare earth phosphors have a high X-ray absorbing power and high efficiency of light emission when excited with X-ray and enable radiologists to use substantially lower X-ray dosage levels. Particularly suitable phosphors for use in the intensifying screen of the present invention are terbium or terbium-thulium activated rare earth oxysulfide phosphors represented by the following general formula:

$$(Ln_{1-a-b}, Tb_a, Tm_b)_2O_2S$$

wherein Ln is at least one rare earth element selected from lanthanum, gadolinium and lutetium, and a and b are numbers meeting the conditions $0.0005 \leq a \leq 0.09$ and $0 \leq b \leq 0.01$, respectively, and terbium or terbium-thulium activated rare earth oxysulfide phosphors represented by the following general formula:

$$(Y_{1-c-a-b}, Ln_c, Tb_a, Tm_b)_2O_2S$$

wherein Ln is at least one rare earth element selected from lanthanum, gadolinium and lutetium, and a, b and c are numbers meeting the conditions $0.0005 \leq a \leq 0.09$, $0 \leq b \leq 0.01$ and $0.65 \leq c \leq 0.95$, respectively. In the formulae, it is preferred that the value of b meets the condition $0 < b \leq 0.01$.

UV-blue emitting phosphors emit radiation preferably have more than about 80% of their spectral emission below 450 nm and their maximum emission in the wavelength range of 300–400 nm. Suitable UV-blue emitting phosphors include UV-blue emitting phosphors generally known in the art such as lead or lanthanum activated barium sulfate phosphors, barium fluorohalide phosphors, lead activated barium silicate phosphors, gadolinium activated yttrium oxide phosphors, barium fluoride phosphors, and alkali metal activated rare earth niobate or tantalate phosphors. UV-blue emitting phosphors are also described for example in BE 703,998 and 757,815, in EP 202,875 and by Buchanan et al., J. Applied Physics, 9, 4342–4347 (1968), and by Clapp and Ginther, J. of the Optical Soc. of America, 37, 355–362 (1947). Particularly suitable UV-blue emitting phosphors for use in the intensifying screen of the present invention are those represented by the following general formula:

$$(Y_{1-\frac{1}{2}x-\frac{1}{2}y}, Sr_x, Li_y)TaO_4$$

wherein x and y are numbers meeting the conditions $10^{-5} \leq x \leq 1$ and $10^{-4} \leq y \leq 0.1$ as described in EP 202,875.

References to other well-known kinds of light emitting phosphors can also be found in Research Disclosure, Vol. 184, August 1979, Item 18431, Section IX.

In the intensifying screen of the present invention, the phosphorescent layer is generally coated on a substrate. Various materials such as polymeric material, glass, wool, cotton, paper, metal, or the like can be used. For ease of handling the screen, the substrate is preferably processed into a sheet or a roll having flexibility. Thus, the substrate is preferably a plastic film (such as a cellulose triacetate film, polyester film, polyethylene terephthalate film, polyamide film, or polycarbonate film), ordinary paper, or processed paper (such as a photographic paper, baryta paper, resin-coated paper, or pigment-containing paper which contains a pigment such as titanium dioxide). The substrate may have a primer layer on one surface thereof (e.g., the surface on which the phosphorescent layer is provided) for holding the phosphorescent layer tightly. Any primer layer well known to those in the art may be used including an adhesive layer. In providing a phosphorescent layer on the substrate (or on the primer layer or on the reflective layer), a coating dispersion comprising the phosphor dispersed in a binder may be directly applied to the substrate (or to the primer layer or to the reflective layer).

Between the phosphor layer and the substrate can be interposed a reflective layer to increase the amount of radiation emitted by the screen. The reflective layer may be composed of any reflective agent or pigment dispersed in a suitable binder. Pigments such as $TiO_2$, $ZrO_2$, $MgO$, $ZnO$, $Al_2O_3$, $PbCO_3$, $MgCO_3$, $PbSO_4$, calcium titanate, and potassium titanate are already known and widely used. The reflective layer can comprise any binder, such as gelatin, gelatin derivatives, polyurethane, polyvinylacetate, polyvinylalcohol and the like. To improve the reflecting power of the substrate, the base support may be metallized by coating a thin layer of a reflective metal, such as, for example, aluminum. The thickness of the reflective layer is generally greater than 10 $\mu$m, preferably in the range of from 15 to 40 $\mu$m.

The procedure for manufacturing the phosphors screens of the present invention includes the following steps.

First, the prepolymer is dispersed in the monomer solution containing all other additional components of the photopolymerizable mixture (including any additional prepolymer, additional monomer, and additives). The dispersion is prepared by adding to the photopolymerzable mixture containing all its components, the phosphor particles in a single or multiple steps and mixing it homogeneously. Alternatively, a phosphor predispersion with a solution of a wetting polymer into the monomers is prepared first, and the remaining components are added later. The resinous binder and the phosphor particles are then blended intimately by means of a three-roll mill, a double planetary or other mixing system.

The resulting dispersion is characterized, according to the present invention, by a high phosphor to unsaturated resin weight ratio in the range of from 1:1 to 20:1, preferably from 10:1 to 15:1, and by a viscosity value in the range of from 10,000 to 1 million cps, preferably of 20,000 to 400,000 cps at 35° C. Phosphor to binder ratio and final viscosity of the dispersion depend on the binder composition, the phosphor grain size employed and the grain surface. A three-roll mill is preferred when the viscosity of the dispersion is higher and several passes are required to homogeneously blend the material. A double planetary mixer is used when the viscosity is low and a paste having good flow characteristics particularly suitable to the process is obtained. The mixing is made at controlled temperature by keeping constant the temperature in the range of from 10 to 50° C., preferably from 10 to 30° C. The temperature control can be helpful to make the workflow easier and to avoid unwanted bulk polymerization when long time mixing is required. The dispersion is then kept under vacuum for a period depending on the amount of dispersion (for example, about 30 minutes for an amount of five kilograms) to get rid of the air generated by the mixing step and dispersed into the bulk. The reduced viscosity plays an important role in facilitating the removal of the bubbles which is fundamental for the following step.

The obtained dispersion is then dispensed by means of a syringe, by extrusion or by other feeding method between a substrate and a cover sheet passing through the gap of a calender and laminated to the desired final thickness. The lamination is preferably conducted vertically in a single pass. If the viscosity of the dispersion is too high and the air cannot be removed completely or if the degassing step is not carried out, it is not possible to laminate the dispersion in a single step and multiple passes are required to remove the bubbles marks and obtain a good coating quality, making the process not suitable to an industrial continuous application.

The laminate is then exposed to radiation and cured. The exposure is performed by exposing the side of the coating where the cover sheet is applied. After curing, the cover sheet is peeled off while the phosphorescent layer firmly sticks to the support. The curing time is very short (in the order of few seconds) and depends either on the coating thickness and composition or on the characteristics of the equipment used. A medium pressure mercury lamp or an electrodeless lamp can be used as a source of UV-visible radiation. An electrodeless doped lamp type D or a V which is characterized by a main output in the region between 360 nm and 420 nm and reduced IR emission is preferred, since the emission around 400 nm will not be adsorbed by the pigments but will be absorbed mainly by the photoinitiator, hence efficient photolysis will occur and a deeper and faster curing will result. The balance of the parameters participating to the curing step is fundamental in determining the physical characteristics required by the cured phosphorescent layer as hardness, adhesion and flexibility. The cover sheet protects the material from atmospheric oxygen which may inhibit the curing and from dirt and scratches during the handling. Any material transparent to the UV light and resistant to mechanical and thermal stresses which does not bond to the phosphor layer during the hardening may be suitable (e.g. PET, PEN, cellulose triacetate).

In the intensifying screen of the present invention, a protective layer for physically and chemically protecting the phosphorescent layer is generally provided on the surface of the phosphorescent layer intended for exposure (on the side opposite the substrate). The protective layer may be provided on the phosphorescent layer by directly applying thereto a coating dispersion to form the protective layer thereon, or may be provided thereon by laminating or adhering thereto the protective layer formed beforehand. As the material of the protective layer, a conventional polymeric material for a protective layer such a nitrocellulose, ethylcellulose, cellulose acetate, polyester, polyethyleneterephthalate, and the like can be used. Curable resin layers can optionally be used as protective layer. Useful examples of curable resin layers are obtained from a blend of one or more thermoplastic binder resins with one or more polymerizable monomer, as described in European Patent Application No. 97-119309.9, titled "Improved Radiographic Screen Construction."

The thermoplastic binder resin is preferably selected from thermoplastic polymers such as polyesters, polycarbonates, polyurethanes, poly(meth)acrylates, cellulose esters and ethers, phenolic resins (including modified versions thereof), poly(vinylalcohol), poly(vinylbutyral), and polymers and copolymers of vinyl monomers such as vinyl chloride, vinyl esters, vinyl ethers, styrene, etc. Fluorinated polymers may be employed as the binder or as a component thereof in order to confer non-stick and/or antistatic properties on the coating. Preferred binder materials include one or more of Elvacite™ 2008 and 2014 (acrylic resins supplied by Du Pont), cellulose acetate butyrate, and Fluorel™ 2330, a fluoropolymer supplied by 3M. A binder typically may constitute from about 10 to about 80 wt % of the curable resin layer, preferably from about 25 to about 65 wt %. Preferred monomers include ethylene glycol dimethacrylate, hydantoin hexa-acrylate, trimethylolpropane triacrylate, and pentaerythritol tetra-acrylate. One or more fluorinated monomers may be included to provide non-stick and/or antistatic properties, e.g. dihydroperfluorooctyl acrylate, perfluorocyclohexyl acrylate or N-ethylperfluorooctylsulphonamidoethyl acrylate. The monomer or mixture of monomers is generally present in an amount from about 15 to about 85 wt % of the curable resin layer, preferably from about 20 to about 40 wt %.

The curable resin layer can be applied onto the phosphorescent layer of the present invention before (one-step process) or after (two-step process) the above described phosphorescent layer curing. In the one-step process, the photocurable protective layer is previously coated onto the cover sheet, and the photocurable phosphorescent coating and the photocurable protective layer will cure together. In the two-step process, the curable protecting layer is laminated onto the cured phosphorescent layer and cured in a separate operation. The layer so bonded onto the phosphorescent layer surface will act as a protective layer after the peeling of the cover sheet improving durability and scratch resistance.

As a support, any material described in the prior art may be used. A primer to help the adhesion of the cured phosphorescent layer or conferring antistatic properties to the coating may be applied.

As a result of the described manufacturing process, a screen having improved physical properties and high image quality is obtained. The use of the photocurable composition of the present invention compared to the conventional binder which crosslinks in a thicker and more packed network is determining to confer to the phosphorescent layer said characteristics.

The screens as described in the following examples are harder and therefore more resistant to mechanical abrasion and deformation, but it will keep at the same time enough adhesion and flexibility to be easily handled and converted. Moreover the high chemical resistance shown by the crosslinked cured coating make it more easily cleaned.

The following tests are performed to evaluate the physical characteristic of the cured phosphorescent layer.

Hardness Test

The hardness of the fluorescent layer is obtained by measuring the penetration deepness (μm) of a probe in the cured screen when a pressure is applied. The lower the number, the higher the hardness.

Adhesion Test

The adhesion of the fluorescent layer onto the support is evaluated by a thumb test and the results are judged as acceptable or not acceptable.

Flexibility Test

The flexibility of the fluorescent layer is performed by bending the coating through a variable gap and measuring the distance from the edge where microcracks are observed. According to the various thickness specifications, the screens are considered acceptable or not acceptable. The following examples also compare the sensitometric performances of some of the screens of this invention to the performances of a Standard Trimax™ T8 screens and of the high density screens described in the U.S. Pat. No. 5,520,965. The shrinking of the coating after curing, leading to a volume decrease, hence a higher packing density of the phosphor layer and the high dispersability of the phosphor into the binder which allows a high pigment loading contribute in providing good sharpness and granularity. The packing density value (PD) was obtained according to the formula PD=$D_1/D_0 \times 100$, wherein $D_1$ is the density of the phosphor layer after curing and $D_0$ is the phosphor density. The measurements taken on the X-ray film image are relative speed, MTF (Modulation Transfer Function) and granularity.

The invention will be described hereinafter by reference to the following examples, which by no means are intended to restrict the scope of the claimed invention.

EXAMPLE 1

All acrylate prepolymers, oligomers and monomers are available from UCB Chemicals or Sartomer unless specified otherwise. T16 Nikia Gadolinium Oxisulfide 01M Phosphor is available from Nikia (Japan). A set of four sample screens were prepared according to the following compositions and methods.

Screen 1 (Invention)

A radiation curable mixture is prepared by dissolving 2% by weight of the photoinitiator Irgacure™ 1800 (blend of 1-hydroxyciclohexyl phenyl ketone 75% and Bis(2,6-dimethoxybenzoyl)-2,4,4-trimethylpentylphosphineoxide 25% from Ciba) into 40% of photopolymerizable monomer tripropyleneglycol diacrylate (MW=300) and 20% of photopolymerizable monomer SR 344 (polyethylene glycol 400 diacrylate from Cray Valley, MW=508), mixing for 15 minutes, then adding to the solution 38% of acrylate prepolymer Ebecryl™ 270 (urethane diacrylate from UCB Chemicals, MW=1500).

T16 Nikia Gadolinium Oxisulfide 01M Phosphor is added to the resin in a ratio of 11:1. The blend is milled in a three-roll mill until it is homogenous, then dispensed between the two rolls of a calender whose gap is set at 425 μm where a PET cover sheet and a polyester substrate coated with a titanium dioxide dispersed in a polyurethane binder reflective layer are winded up. The paste is laminated vertically in a single pass and the sandwich obtained is continuously passed under a UV lamp with an H bulb located at 10 cm of distance from the coating surface at a speed of about 5 m/min. The cover sheet is removed and a 150 μm thickness phosphorescent layer is obtained.

Screen 2 (Comparison)

A radiation curable mixture is prepared by dissolving 2% by weight of the photoinitiator Irgacure™ 1800 (blend of 1-hydroxyciclohexyl phenyl ketone 75% and Bis(2,6-dimethoxybenzoyl)-2,4,4-trimethylpentylphosphineoxide 25% from Ciba) into 20% of photopolymerizable monomer hexandiol diacrylate (MW=226) mixing for 15 minutes then adding to the solution 44% of additional prepolymer Ebecryl™ 450 (polyester acrylate from UCB Chemicals) and 34% of urethane acrylate prepolymer Ebecryl™ 270 (urethane diacrylate from UCB Chemicals).

T16 Nikia Gadolinium Oxisulfide 01M Phosphor is added to the resin in a ratio of 11:1. The blend is passed in a three-roll mill until it is homogenous then placed between the two rolls of a calender whose gap is set at 425 μm where a PET cover sheet and a polyester substrate coated with a titanium dioxide dispersed in a polyurethane binder reflective layer are winded. The paste is laminated vertically in a single pass and the sandwich obtained is continuously passed under a UV lamp with an H bulb located at 10 cm distance from the coating surface at a speed of about 5 m/min. The cover sheet is removed and a phosphorescent layer with thickness of 150 μm is obtained.

Screen 3 (Comparison)

A radiation curable mixture is prepared by dissolving 2% by weight of the photoinitiator Irgacure™ 1800 (blend of 1-hydroxyciclohexyl phenyl ketone 75% and Bis(2,6-dimethoxybenzoyl)-2,4,4-trimethylpentylphosphineoxide 25% from Ciba) into 40% photopolymerizable monomer tripropylenglycol diacrylate, mixing for 15 minutes then adding to the solution 20% of additional prepolymer SR 344 (polyethylene glycol 400 diacrylate from Cray Valley), 36% of acrylate prepolymer Ebecryl™ 270 (urethane diacrylate from UCB Chemicals), and 2% of additive Coatosil™ 3501 (silicon acrylate from OSI). T16 Nikia Gadolinium Oxisulfide 01M Phosphor is added to the resin in a ratio of 11:1. The blend is milled in a three-roll mill until it is homogenous then placed between the two rolls of a calender whose gap is set at 425 μm where a PET cover sheet and a polyester substrate coated with a titanium dioxide dispersed in a polyurethane binder reflective layer are winded up. The paste is laminated vertically in a single pass and the sandwich obtained is continuously passed under a UV lamp with an H bulb located at 10 cm distance from the coating surface at a speed of about 5 m/min. The cover sheet is removed and a phosphorescent layer with thickness of 150 μm is obtained.

Screen 4 (Invention)

A radiation curable mixture is prepared by dissolving 2% by weight of the photoinitiator Irgacure™ 1800 (blend of 1-hydroxyciclohexyl phenyl ketone 75% and Bis(2,6-dimethoxybenzoyl)-2,4,4-trimethylpentylphosphineoxide 25% from Ciba) into 35% photopolymerizable monomer tripropylenglycol diacrylate and 23% of photopolymerizable monomer lauryl acrylate (available from Aldrich, MW=240) and mixing for 15 minutes then adding to the solution 8% of additional prepolymer Ebecryl™ 2870 (fatty acid modified hexafunctional polyester acrylate from UCB Chemicals, MW higher than 600). The resulted solution is mixed in a double planetary mixer with T16 Nikia Gadolinium Oxisulfide 01M Phosphor in a ratio of 11:1 for 15 minutes.

The high viscosity paste is then added with the 32% of acrylate prepolymer Ebecryl™ 270 (urethane diacrylate from UCB Chemicals) and the dispersion mixed for 1 h, the vacuum applied for 10 minutes giving a final viscosity of 20,000 cps at 35° C. The homogenous dispersion is then fed between the two rolls of a calender whose gap is set at 425 μm where a PET cover sheet and a polyester substrate coated with a titanium dioxide dispersed in a polyurethane binder reflective layer are winded up.

The paste is laminated in a single pass and the sandwich obtained is continuously passed under a UV lamp with an H bulb located at 10 cm distance from the coating surface at a speed of about 10 m/min. The cover sheet is removed and a phosphorescent layer with thickness of 120 μm is obtained having a good coating quality and high sharpness and granularity.

Each sample screen was subjected to the above described hardness, adhesion and flexibility test together with a conventional Trimax™ T8 screen (manufactured by Imation Corp., Screen 5) and an organo polysiloxane based intensifying screen (Screen 6) obtained according to the teaching of U.S. Pat. No. 5,520,965. The results are summarized in the following Table 1.

TABLE 1

| Screen | Penetration (μm) | Adhesion | Flexibility | Thickness |
|---|---|---|---|---|
| Screen 1 | 0 | Acceptable | Acceptable | 150 |
| Screen 2 | 0 | Not acceptable | Not acceptable | 150 |
| Screen 3 | 35 | Not acceptable | Acceptable | 150 |
| Screen 4 | 3 | Acceptable | Acceptable | 120 |
| Screen 5 | 5 | Acceptable | Acceptable | 110 |
| Screen 6 | 26 | Not acceptable | Acceptable | 120 |

By comparing the results of screens 1 and 4 of the present invention with the results of reference screens 5 and 6, it is clear that the screens of the present invention provide a significant improvement in hardness and adhesion onto the reflective layer while maintaining acceptable flexibility. On the other hand, by comparing screen 1 with screen 3, it is clear that a 2% amount of a silicon acrylate negatively affects the hardness and adhesion of the resulting phosphorescent layer. Moreover, by comparing screen 4 with screen 2, it is clear that higher amounts of polyester acrylate negatively affect the adhesion and flexibility of the resulting phosphorescent layer.

EXAMPLE 2

Screen 7 (Invention)

A radiation curable mixture is prepared by dissolving 2% by weight of the photoinitiator Irgacure™ 1800 (blend of 1-hydroxyciclohexyl phenyl ketone 75% and Bis(2,6-dimethoxybenzoyl)-2,4,4-trimethylpentylphosphineoxide 25% from Ciba) into 40% photopolymerizable monomer tripropylenglycol diacrylate, mixing for 15 minutes then adding to the solution 20% of additional prepolymer SR 344 (polyethylene glycol 400 diacrylate from Cray Valley), 37% of acrylate prepolymer Ebecryl™ 270 (urethane diacrylate from UCB Chemicals) and 1% of additive Byk 110 (acrylate-acrylic acid polymer with phosphoric acid). T16 Nikia Gadolinium Oxisulfide 01M Phosphor is added to the resin in a ratio of 11.5:1. The blend is mixed in a double planetary mixer for 4 h at 30° C. and the vacuum applied for 30 minutes. The dispersion obtained having a viscosity of about 100,000 cps at 35° C. is fed between the two rolls of a calender whose gap is set at 425 μm where a PET cover sheet and a polyester substrate coated with a titanium dioxide dispersed in a polyurethane binder reflective layer are winded up. The paste is laminated in a single pass and the sandwich obtained is continuously passed under a UV lamp with a D bulb located at 10 cm distance from the coating surface at a speed of about 5 m/min. The cover sheet was removed and a fluorescent layer with thickness of 131 μm was obtained.

Hardness test, adhesion test and flexibility test were performed on screen 7 together with the same screen 6 of Example 1 and the results are summarized in Table 2 below:

TABLE 2

| Screen | Penetration (μm) | Flexibility | Adhesion | Thickness | Packing Density |
|---|---|---|---|---|---|
| Screen 6 | 26 | Acceptable | Not acceptable | 124 | 60.27 |
| Screen 7 | 7 | Acceptable | Acceptable | 131 | 64.80 |

An X-ray film (XDA Plus APS manufactured by Imation Corp.) was exposed to X-ray in combination with the front and back screens of the following Table 3. The X-ray film was developed with conventional black-and-white developer and the results are summarized in the following Table 3. Speed values have been normalized to Screen 5 (the same screen 5 of Example 1).

Exposures were done at 80 kVp using a Philips X-ray Set, ROT 350 Type XD6010 III with 2 mm Al filter, using a 1 meter FFD, with bucky grid and an AL step wedge. Analysis was done with a J-L Automation Microdensitometer 6. Modulation Transfer Function (MTF) calculation was based on the edge method described in "Image Science", J. C Dainty & R. Shaw, Academic Press, 1974, pages 244–246 'Spread Function Methods'. Selwyn Granularity values were based on the method described in the same publication, at page 58, by using a 400 μm diameter circular aperture, analyzing 900 density measurement at each density level. Calculations were performed on 36 groups of 25 measurements to filter out very low spatial frequency noise. The 36 results were then averaged.

TABLE 3

| Screen | Speed | MTF (2 lp/mm) | Selwyn Granularity |
|---|---|---|---|
| Screen 5 | 0 | 0, 334 | 9, 3 |
| Screen 6 | 0, 14 | 0, 31 | 10, 2 |
| Screen 7 | 0, 15 | 0, 286 | 9, 4 |

EXAMPLE 3

Screen 8 (Invention)

A radiation curable mixture is prepared by dissolving 2% by weight of the photoinitiator Irgacure™ 1800 (blend of 1-hydroxyciclohexyl phenyl ketone 75% and Bis(2,6-dimethoxybenzoyl)-2,4,4-trimethylpentylphosphineoxide 25% from Ciba) into 40% photopolymerizable monomer tripropylenglycol diacrylate, mixing for 15 minutes then adding to the solution 20% of additional prepolymer SR 344 (polyethylene glycol 400 diacrylate from Cray Valley), 37% of acrylate prepolymer Ebecryl™ 270 (urethane diacrylate from UCB Chemicals) and 1% of additive Byk 110 (acrylate-acrylic acid polymer with phosphoric acid). T6 Nikia Gadolinium Oxisulfide 67M Phosphor is added to the resin in a ratio of 11:1. The blend is mixed in a double planetary mixer for 4 h at 30° C. and the vacuum applied for 30 minutes. The dispersion obtained having a viscosity of about 100,000 cps at 35° C. is fed between the two rolls of a calender whose gap is set at 425 μm where a PET cover sheet and a polyester substrate coated with a titanium dioxide dispersed in a polyurethane binder reflective layer are winded up. The paste is laminated in a single pass and the sandwich obtained is continuously passed under a UV lamp with a D bulb located at 10 cm distance from the coating surface at a speed of about 5 m/min. The cover sheet was removed and a fluorescent layer with thickness of 152 μm was obtained.

Hardness test, adhesion test and flexibility test were performed on screen 8 together with the same screen 6 of Example 1 and the results are summarized in table 4 below.

TABLE 4

| Screen | Penetration (μm) | Flexibility | Adhesion | Thickness | Packing Density |
|---|---|---|---|---|---|
| Screen 6 | 26 | Acceptable | Not acceptable | 140 | 58.40 |
| Screen 8 | 7 | Acceptable | Acceptable | 140 | 61.87 |

An X-ray film (XDA Plus APS manufactured by Imation Corp.) was exposed to X-ray in combination with the front and back screens of the following Table 5. The X-ray film was developed with conventional black-and-white developer and the results are summarized in the following Table 5. Speed values have been normalized to Screen 5 (the same screen 5 of Example 1).

TABLE 5

| Screen | Speed | MTF (2 lp/mm) | Selwyn Granularity |
|---|---|---|---|
| Screen 5 | 0 | 0, 334 | 9, 3 |
| Screen 6 | 0, 15 | 0, 32 | 9, 7 |
| Screen 8 | 0, 12 | 0, 334 | 9, 9 |

EXAMPLE 3

Screen 9 (Invention)

A radiation curable mixture is prepared by dissolving 2% by weight of the photoinitiator Irgacure™ 1800 (blend of 1-hydroxyciclohexyl phenyl ketone 75% and Bis(2,6-dimethoxybenzoyl)-2,4,4-trimethylpentylphosphineoxide 25% from Ciba) into 40% photopolymerizable monomer tripropylenglycol diacrylate, mixing for 15 minutes then adding to the solution 20% of additional prepolymer SR 344 (polyethylene glycol 400 diacrylate from Cray Valley), acrylate prepolymer 37% of Ebecryl™ 270 (urethane diacrylate from UCB Chemicals) and 1% of additive Byk 110 (acrylate-acrylic acid polymer with phosphoric acid). T6 Nikia Gadolinium Oxisulfide 01M Phosphor is added to the resin in a ratio of 11.3:1. The blend is mixed in a double planetary mixer for 4 h at 30° C. and the vacuum applied for 30 minutes. The dispersion obtained having a viscosity of about 80,000 cps at 35° C. is fed between the two rolls of a calender whose gap is set at 425 μm where a polyester reflective layer and a PET cover sheet coated with a curable resin layer are winded up. The paste is laminated in a single pass and the sandwich obtained is continuously passed under a UV lamp with a V bulb located at 10 cm distance from the coating surface at a speed of about 5 m/min.

When the cover sheet is removed, the curable resin layer has been cured and sticks on the fluorescent layer protecting the surface by improving surface hardness and chemical and abrasion resistance and conferring antistaticity to the screen. A phosphorescent layer with thickness of 129 μm was obtained.

Screen 10 was prepared according to the same procedure of screen 9 but omitting the curable resin top-layer. The curable resin top-layer had the following composition.

| Trade Name | Chemical and Manufacturer | Percentage (by weight) |
|---|---|---|
| Elvacite ™ 2014 | acrylic polymer (Du Pont) | 60 |
| CAB 381-20 | cellulose acetate butyrate (Eastman Chemical) | — |
| Santiciser ™ 278 | benzyl phthalate (plasticizer) (Monsanto) | 5 |
| Sartomer ™ 399 | polyfunctional acrylate monomer (Cray Valley) | 25 |
| Darocur ™ 4265 | acylphosphine oxide photoinitiator (Ciba Geigy) | 6 |
| Blankophor ™ MAN 01 | optical brightener (sensitizer) (Bayer) | 1 |
| Catanac ™ 609 | | 1 |
| Cyastat ™ SN | antistat (American Cyanamid) | 1 |
| % Solids in coating solution | | 25 |
| Dry coating weight (g/m²) | | 5.8 |

Hardness test, adhesion test and flexibility test were performed on screens 9 and 10, and the results are summarized in Table 6 below. The hardness test has been performed with the Koenig pendulum and the results are expressed in terms of number of oscillations.

TABLE 6

| | Screen 9 | Screen 10 |
|---|---|---|
| Hardness | 32 | 29 |
| Flexibility | Acceptable | Acceptable |
| Adhesion | Acceptable | Acceptable |
| Thickness (μm) | 129 | 133 |
| Packing Density | 64.80 | 60.27 |
| Resistivity (Ω/sqm) | $1.7 \times 10^{10}$ | $0.3 \times 10^{14}$ |
| Decay Time (sec) | 2.2 | * |

* Not measurable

What is claimed is:

1. An X-ray intensifying screen comprising a support having deposited thereon a phosphorescent layer comprising a phosphor dispersed in a photocurable binder, wherein said binder comprises a photopolymerizable mixture of at least one urethane (meth)acrylate prepolymer, at least one photopolymerizable monomer and/or oligomer, and a photoinitiator, and said phosphorescent layer is cured by radiation after deposition onto said support, wherein said urethane (meth)acrylate prepolymer has a weight-average molecular weight ranging from 600 to 10,000.

2. The X-ray intensifying screen of claim 1, wherein said urethane (meth)acrylate prepolymer is selected from the group consisting of polyether urethane (meth)acrylates, polyester urethane (meth)acrylates, and polyol urethane (meth)acrylates.

3. The X-ray intensifying screen of claim 1, wherein said urethane (meth)acrylate prepolymer is selected from the group consisting of aliphatic polyether urethane (meth)acrylates and aliphatic polyester urethane (meth)acrylates.

4. The X-ray intensifying screen of claim 1, wherein said photopolymerizable monomer and/or oligomer is selected from the group consisting of (meth)acrylic esters of polyhydroxy alcohol derivatives.

5. The X-ray intensifying screen of claim 1, wherein said photopolymerizable mixture further comprises at least one additional prepolymer.

6. The X-ray intensifying screen of claim 5, wherein said additional prepolymer is selected from the group consisting of epoxy (meth)acrylates and polyester (meth)acrylates.

7. The X-ray intensifying screen of claim 1, wherein said photoinitiator absorbs light having wavelength of from 200 to 500 nm.

8. The X-ray intensifying screen of claim 1, wherein said photoinitiator is selected from the group consisting of benzoin derivatives, acethophenone derivatives, benzylketals, α-hydroxyalkylphenones, α-aminoalkylphenones, acylphosphine oxides, acylphosphonates, benzophenone, xanthones, tioxanthones and aromatic 1,2-diketones.

9. The X-ray intensifying screen of claim 1, wherein said urethane (meth)acrylate prepolymer are added in an amount ranging from 20% to 50% by weight of the photocurable resinous binder.

10. The X-ray intensifying screen of claim 5, wherein said additional prepolymer has a weight-average molecular weight ranging from 600 to 10,000.

11. The X-ray intensifying screen of claim 1, wherein said additional prepolymer is added in an amount ranging from 1% to 30% by weight of the photocurable resinous binder.

12. The X-ray intensifying screen of claim 1, wherein said photopolymerizable monomer has a weight-average molecular weight lower than 500.

13. The X-ray intensifying screen of claim 1, wherein said photopolymerizable monomer is added in an amount ranging from 0.01% to 10% by weight of the photocurable resinous binder.

14. The X-ray intensifying screen of claim 1, wherein said photopolymerizable mixture further comprises at least one additional reacting monomer.

15. The X-ray intensifying screen of claim 14, wherein said additional reacting monomer is selected from the group consisting of monofunctional (meth)acrylates and non-acrylate monomers.

16. The X-ray intensifying screen of claim 15, wherein said monofunctional (meth)acrylate monomer is selected from the group consisting of alkyl (meth)acrylates, hydroxyalkyl (meth)acrylates, b-carboxyethyl (meth)acrylate, isobornyl (meth)acrylate, tetrahydrofurfuryl (meth)acrylate, 2-(2-ethoxyethoxy)ethyl (meth)acrylate, and aliphatic urethane (meth)acrylates.

17. The X-ray intensifying screen of claim 15, wherein said non-acrylate monomer is selected from the group consisting of styrene, vinyl acetate, and N-vinyl pyrrolidone.

18. The X-ray intensifying screen of claim 1, wherein said phosphor dispersion has a viscosity value comprised in the range of from 10,000 to 1,000,000 cps at 35° C.

19. The X-ray intensifying screen of claim 1, wherein said phosphor dispersion has a phosphor to binder weight ratio of from 1:1 to 20:1.

* * * * *